(12) United States Patent
Takeda et al.

(10) Patent No.: US 11,375,459 B2
(45) Date of Patent: Jun. 28, 2022

(54) DYNAMIC POWER SHARING WITH OR WITHOUT LOOK-AHEAD

(71) Applicant: QUALCOMM Incorporated, San Diego, CA (US)

(72) Inventors: Kazuki Takeda, Tokyo (JP); Seyedkianoush Hosseini, San Diego, CA (US); Peter Gaal, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/161,256

(22) Filed: Jan. 28, 2021

(65) Prior Publication Data
US 2021/0258890 A1  Aug. 19, 2021

Related U.S. Application Data

(60) Provisional application No. 62/976,922, filed on Feb. 14, 2020.

(51) Int. Cl.
*H04W 52/34* (2009.01)
*H04W 52/36* (2009.01)

(52) U.S. Cl.
CPC ....... *H04W 52/346* (2013.01); *H04W 52/365* (2013.01)

(58) Field of Classification Search
CPC ............. H04W 52/346; H04W 52/365; H04W 52/146; H04W 52/34; H04W 52/367

(Continued)

(56) References Cited

U.S. PATENT DOCUMENTS

| 10,142,945 | B2 * | 11/2018 | Papasakellariou | .... H04W 52/34 |
| 10,986,622 | B2 * | 4/2021 | Zhang | .................... H04B 7/088 |
| 2019/0174449 | A1 * | 6/2019 | Shan | .................... H04W 76/11 |

OTHER PUBLICATIONS

"Technical Specification Group Radio Access Network; NR; Physical layer procedures for control (Release 16)", 3GPP Standard ; Technical Specification; 3GPP TS 38.213, 3rd Generation Partnership Project (3GPP), val. RAN WG1, No. V16.0.0 Jan. 14, 2020 (Jan. 14, 2020), pp. 1-146, XPO51T 860806 (Year: 2020).*

(Continued)

*Primary Examiner* — John J Lee
(74) *Attorney, Agent, or Firm* — Harrity & Harrity, LLP (57) ABSTRACT

Various aspects of the present disclosure generally relate to wireless communication. In some aspects, a user equipment (UE) may receive configuration information indicating a master cell group (MCG) maximum power value and a secondary cell group (SCG) maximum power value. The UE may determine whether a combination of the maximum power values satisfies a threshold. The UE may perform a transmission on the SCG using a first transmit power and a transmission on the MCG using a second transmit power, wherein, based on the combination of the MCG maximum power value and the SCG maximum power value satisfying the threshold, the first transmit power is determined based on a time offset, or wherein, based on the combination of the MCG maximum power value and the SCG maximum power value failing to satisfy the threshold, the first transmit power is determined without using the time offset. Numerous other aspects are described.

24 Claims, 5 Drawing Sheets

(58) Field of Classification Search
USPC .......... 455/522, 69, 509, 517, 452.1, 67.11
See application file for complete search history.

(56) References Cited

OTHER PUBLICATIONS

3GPP TS 38.213: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis, Cedex, France, vol. RAN WG1, No. V16.0.0, Dec. 2019, Jan. 14, 2020 (Jan. 14, 2020), XP051860806, pp. 1-146, Retrieved from the Internet: URL: http://ftp.3gpp.org/Specs/archive/38_series/38.213/38213-g00.zip 38213-g00.docx [retrieved on Jan. 14, 2020], section 7.6.2, Section 10, Section 10.1, p. 100, Section 10.3, Paragraph [09.1], clause 7.2.1, p. 23-p. 25, clause 9, p. 4 9, paragraph 3 clause 9.1, p. 49, paragraph 4-paragraph 15 clause 9.1.1, p. 50, paragraph 5-paragraph 6 clause 9.1.2.1, p. 55 clause 9.1.3, p. 57, paragraph 8 clause 9.1.3.1, p. 61, paragraph 1-paragraph 2 clause 9.1.3.2, p. 63, paragraph 6 clause 9.1.3.3, p. 64, paragraph 1-p. 65, paragraph 10, p. 56. paragraph 6-p. 57, paragraph 1 ch , 9.2.3, p. 73, paragraph, 5 p. 44, paragraph 8, p. 10, paragraph 1 p. 105-p. 106, tables 10.2-1. 10.2-2.

Ericsson: "Power Control for NR-NR DC", 3GPP Draft, 3GPP TSG-RAN WG1 #99, R1-1912784, 3rd Generation Partnership Project (3GPP), Mobile Competence Centre, 650, Route Des Lucioles, F-06921, Sophia-Antipolis, Cedex, France, vol. RAN WG1, No. Reno, USA, Nov. 18. 2019-Nov. 22, 2019, Nov. 9, 2019 (Nov. 9, 2019), XP051823596, 4 pages, Retrieved from the Internet: URL:https://ftp.3gpp.org/tsg_ran/WG1_RL1/TSGR1_99/Docs/R1-1912784.zip R1-1912784_nrdc_ulpc_v0.docx [retrieved on Nov. 9, 2019], section 2.

International Search Report and Written Opinion—PCT/US2021/015791—ISA/EPO—dated May 4, 2021.

* cited by examiner

DYNAMIC POWER SHARING WITH OR WITHOUT LOOK-AHEAD

CROSS-REFERENCE TO RELATED APPLICATION

This patent application claims priority to U.S. Provisional Patent Application No. 62/976,922, filed on Feb. 14, 2020, entitled "DYNAMIC POWER SHARING WITH OR WITHOUT LOOK-AHEAD," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for dynamic power sharing with or without look-ahead.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving configuration information indicating a master cell group (MCG) maximum power value and a secondary cell group (SCG) maximum power value; determining whether a combination of the MCG maximum power value and the SCG maximum power value satisfies a threshold; and performing a transmission on the SCG using a first transmit power and a transmission on the MCG using a second transmit power, wherein, based at least in part on the combination of the MCG maximum power value and the SCG maximum power value satisfying the threshold, the first transmit power is determined based at least in part on a time offset associated with the transmission on the SCG, or wherein, based at least in part on the combination of the MCG maximum power value and the SCG maximum power value failing to satisfy the threshold, the first transmit power is determined without using the time offset.

In some aspects, a UE for wireless communication may include a memory and one or more processors operatively coupled to the memory. The memory and the one or more processors may be configured to receive configuration information indicating an MCG maximum power value and an SCG maximum power value; determine whether a combination of the MCG maximum power value and the SCG maximum power value satisfies a threshold; and perform a transmission on the SCG using a first transmit power and a transmission on the MCG using a second transmit power, wherein, based at least in part on the combination of the MCG maximum power value and the SCG maximum power value satisfying the threshold, the first transmit power is determined based at least in part on a time offset associated with the transmission on the SCG, or wherein, based at least in part on the combination of the MCG maximum power value and the SCG maximum power value failing to satisfy the threshold, the first transmit power is determined without using the time offset.

In some aspects, a non-transitory computer-readable medium may store one or more instructions for wireless communication. The one or more instructions, when executed by one or more processors of a UE, may cause the one or more processors to receive configuration information indicating an MCG maximum power value and an SCG maximum power value; determine whether a combination of the MCG maximum power value and the SCG maximum power value satisfies a threshold; and perform a transmission on the SCG using a first transmit power and a transmission on the MCG using a second transmit power, wherein, based at least in part on the combination of the MCG maximum power value and the SCG maximum power value satisfying the threshold, the first transmit power is determined based at least in part on a time offset associated with the transmission on the SCG, or wherein, based at least in part on the combination of the MCG maximum power value and the SCG maximum power value failing to satisfy the threshold, the first transmit power is determined without using the time offset.

In some aspects, an apparatus for wireless communication may include means for receiving configuration information indicating an MCG maximum power value and an SCG maximum power value; means for determining whether a combination of the MCG maximum power value and the SCG maximum power value satisfies a threshold; and means for performing a transmission on the SCG using a first transmit power and a transmission on the MCG using a second transmit power, wherein, based at least in part on the combination of the MCG maximum power value and the SCG maximum power value satisfying the threshold, the first transmit power is determined based at least in part on a time offset associated with the transmission on the SCG, or wherein, based at least in part on the combination of the MCG maximum power value and the SCG maximum power value failing to satisfy the threshold, the first transmit power is determined without using the time offset.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
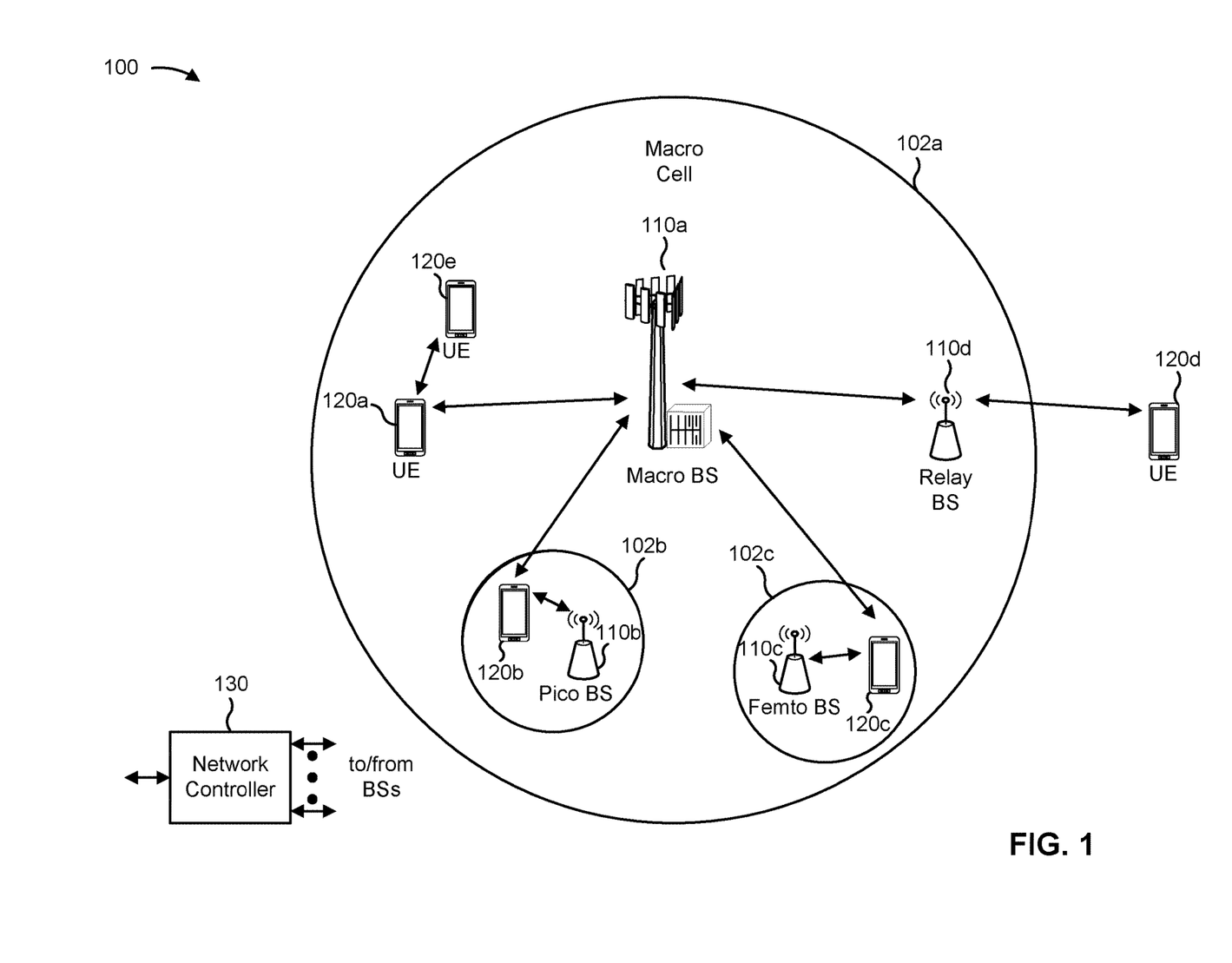
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 megahertz (MHz) to 7.125 gigahertz (GHz), and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
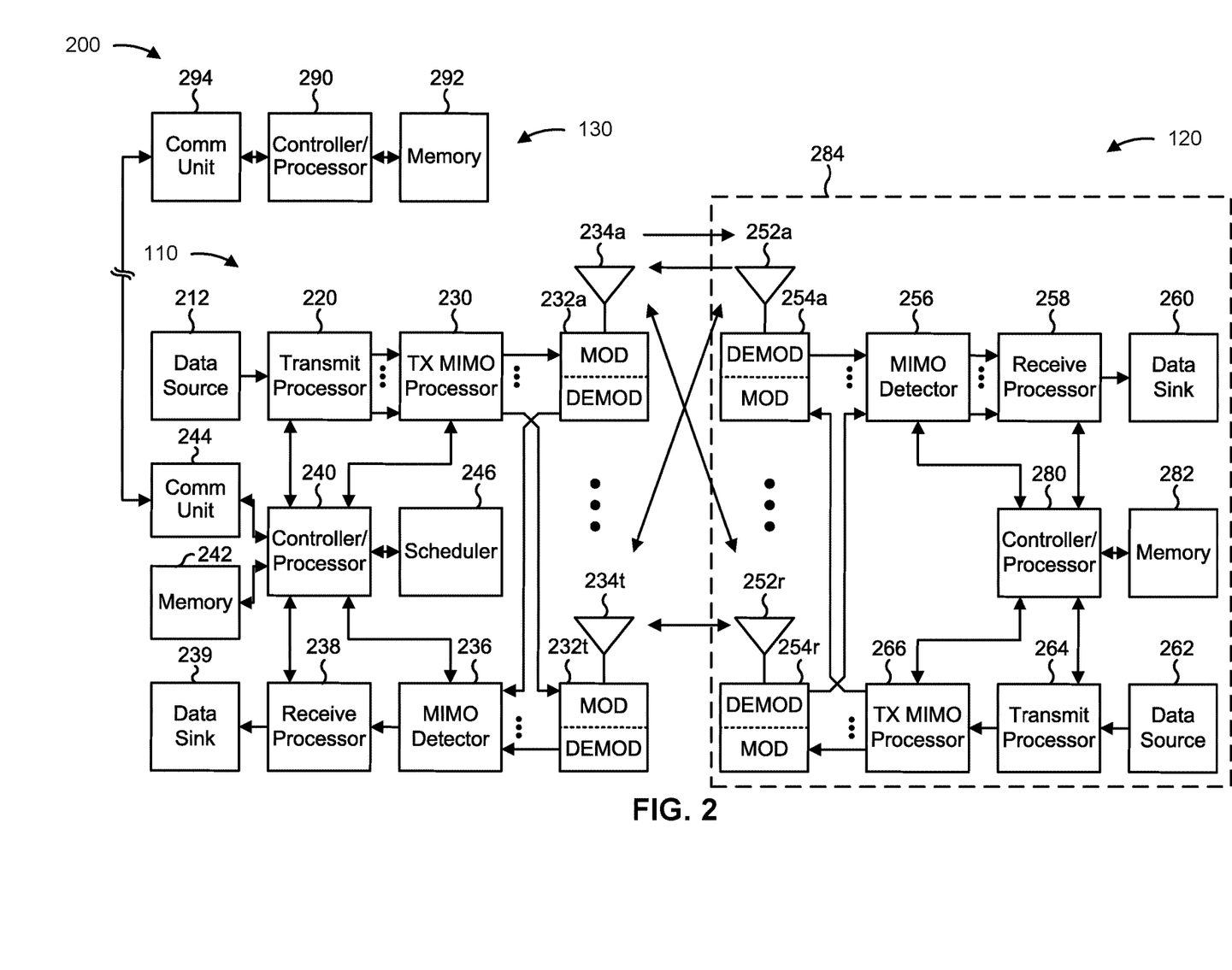
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with dynamic power sharing with or without look-ahead, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some aspects, executing instructions may include running the instructions, converting the instructions, compiling the instructions, and/or interpreting the instructions, among other examples.

In some aspects, UE 120 may include means for receiving configuration information indicating a master cell group (MCG) maximum power value and a secondary cell group (SCG) maximum power value; means for determining whether a combination of the MCG maximum power value and the SCG maximum power value satisfies a threshold; means for performing a transmission on the SCG using a first transmit power and a transmission on the MCG using a second transmit power; means for determining the first transmit power based at least in part on whether a time at which control information, associated with the transmission on the MCG, is received precedes a start of the transmission on the SCG by at least the time offset; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may connect to multiple cells or component carriers (CCs) at once. For example, New Radio dual connectivity (NR-DC) may provide for a connection to one or more cells in an MCG and one or more cells in an SCG. In some cases, a transmit power of a transmission associated with the MCG may be prioritized over a transmit power of a transmission on the SCG. Thus, in cases where the UE is power limited and transmissions on the MCG and the SCG overlap each other, the UE may reduce a transmit power on the SCG to accommodate the transmission on the MCG's transmit power.

In some aspects, the UE may perform power control based at least in part on a time offset, also referred to as a look-ahead. The time offset may identify a length of time that is measured backward from a start of a transmission on the SCG. The UE may not expect to receive control information (e.g., uplink downlink control information (DCI) scheduling a transmission on the MCG after a point in time, preceding the start of the transmission on the SCG, defined by the time offset. This time offset may enable robust MCG transmissions, by providing the UE with time to handle dynamic power control before transmission on the MCG. However, the time offset may introduce delay between scheduling an MCG transmission and transmitting the MCG transmission. This delay may be particularly problematic since there may be certain configurations of the UE that do not pose a problem for power control. In such a case, the time offset may introduce latency with little benefit.

Some techniques and apparatuses described herein provide for power control that selectively uses the time offset, or does not use the time offset, based at least in part on a configuration of the UE. For example, if the UE is power limited and is configured for dynamic power control, then the UE may use the time offset, thereby ensuring that sufficient transmit power is available for the transmission on the MCG. If the UE is not power limited, then the UE may not use the time offset for uplink power control, thereby reducing delay associated with scheduling and transmitting the transmission on the MCG. Thus, dynamic power control that selectively uses a time offset may improve robustness and reliability of transmissions on the MCG while reducing delay associated with scheduling transmissions on the MCG.

Figure 3:
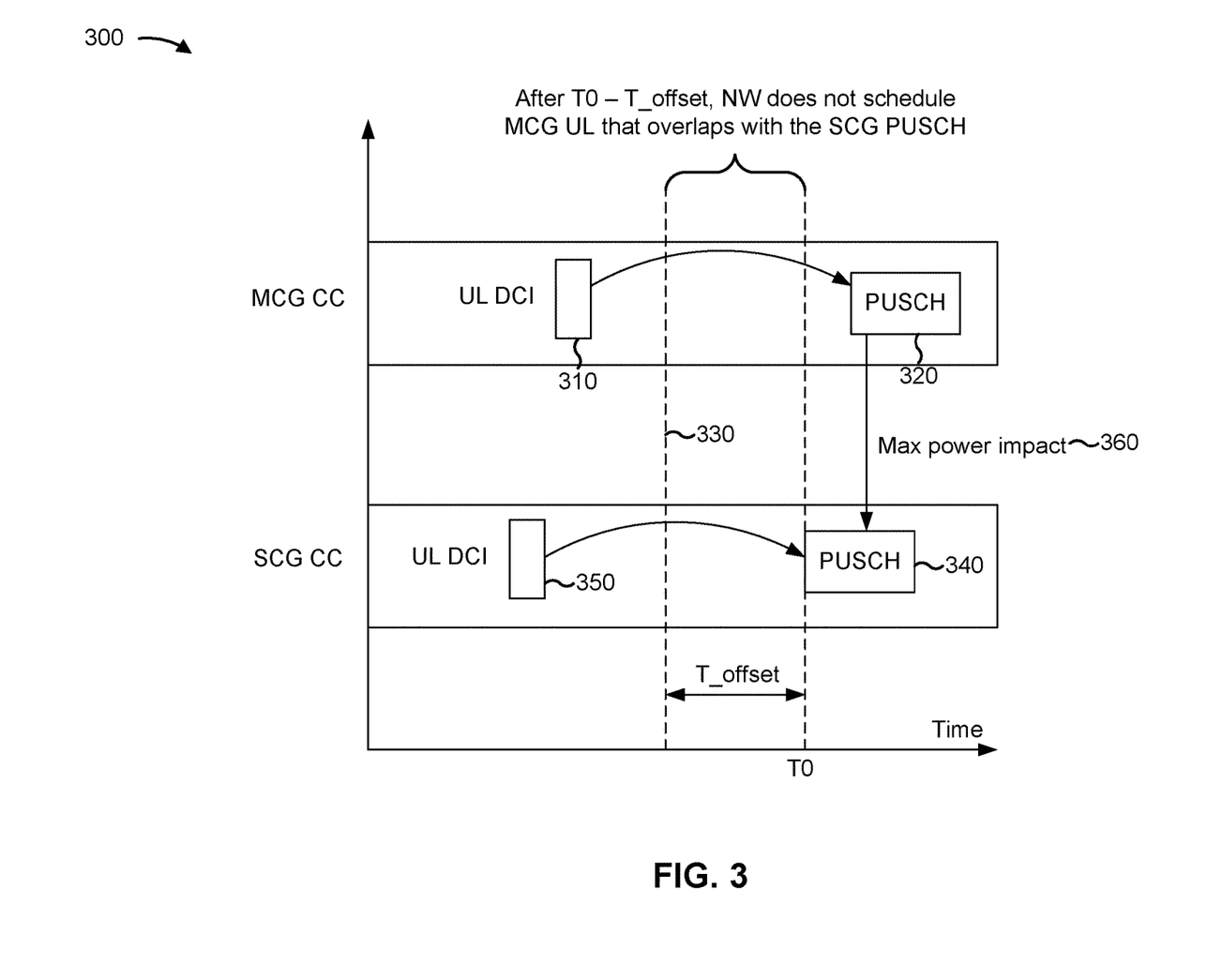
FIG. 3 is a diagram illustrating an example of transmission of a first transmission on an MCG and a second transmission on an SCG, in accordance with the present disclosure.

FIG. 3 is a diagram illustrating an example 300 of transmission of a first transmission on an MCG and a second transmission on an SCG with dynamic power sharing using look-ahead, in accordance with the present disclosure. Example 300 shows an MCG component carrier (CC) and an SCG CC. For example, the operations shown in example 300 may be performed by a UE (e.g., UE 120).

As shown by reference number 310, the UE may receive, on the MCG CC, UL DCI. For example, the UL DCI 310 may schedule a physical uplink shared channel (PUSCH) 320 on the MCG CC. In this case, the PUSCH may be referred to as a dynamic grant (DG) PUSCH. As further shown, the UE may receive the UL DCI 310 before a deadline 330. For example, the deadline 330 may be defined by T0−T_offset, where T0 is a start of an uplink transmission 340 and T_offset is an offset time relative to T0. The uplink transmission 340 may be scheduled by UL DCI 350. The UE may not expect UL DCI scheduling a PUSCH on the MCG that overlaps with a PUSCH on the SCG after the deadline 330, since, in such a case, the UE may have difficulty performing power management for the MCG and the SCG.

When the UE performs dynamic power sharing for the MCG and the SCG, the MCG's transmit power may impact the SCG's transmit power, as shown by reference number 360. For example, for transmit power determination of the PUSCH 320, the UE may not be required to take into account a transmit power of the SCG. This may be referred to as a 3GPP Release 15 carrier aggregation power allocation procedure within the MCG. For transmit power determination of the PUSCH 340, the UE may take into account an overlapping MCG uplink transmission (e.g., the PUSCH 320) that was scheduled before the deadline 330. For example, the UE may determine the maximum transmit power of the SCG as $\min\{P_{SCG}, P_{total}-\text{MCG tx power}\}$, wherein $P_{SCG}$ is a baseline transmit power of the PUSCH 340, $P_{total}$ is a maximum UE transmit power, and MCG tx power is a transmit power of the PUSCH 320. For an SCG transmission starting at time T0, the network may not schedule an overlapping MCG uplink transmission after T0−T_offset.

As indicated above, FIG. 3 is provided as an example. Other examples may differ from what is described with respect to FIG. 3.

Figure 4:
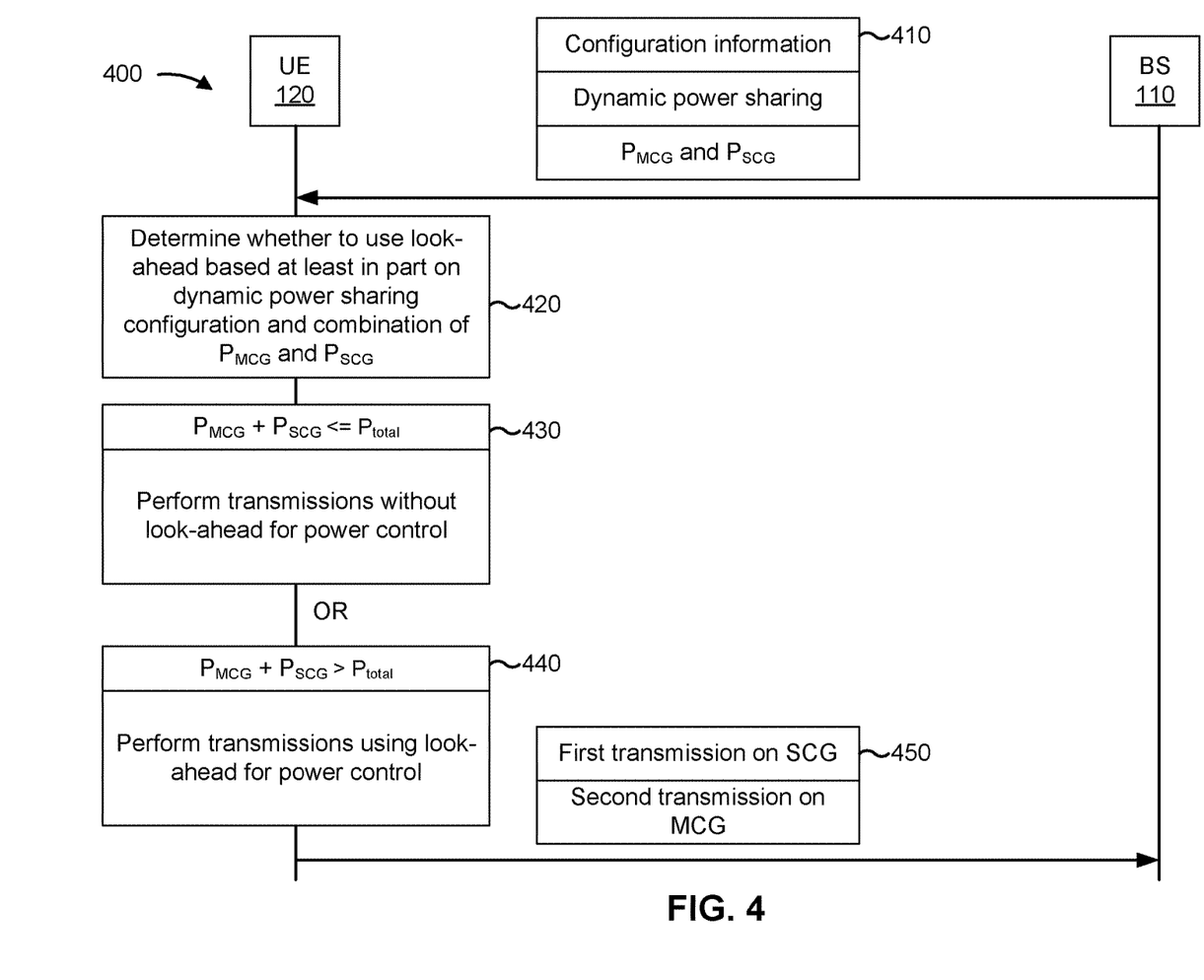
FIG. 4 is a diagram illustrating an example of selectively performing power control using a time offset, in accordance with the present disclosure.

FIG. 4 is a diagram illustrating an example 400 of selectively performing power control using a time offset, in accordance with the present disclosure. The operations described in connection with FIG. 4 may be performed by a UE (e.g., UE 120 and/or the like). As shown, FIG. 4 includes a UE 120 and a BS 110.

As shown by reference number 410, the UE 120 may receive configuration information from the BS 110. As further shown, the configuration information may identify a dynamic power sharing configuration (e.g., NR-DC-PC-mode or another configuration variable). The dynamic power sharing configuration may indicate that the UE 120 is to use dynamic power sharing in order to determine transmit powers for a transmission on an MCG and a transmission on an SCG of the UE 120. As further shown, the configuration information may identify MCG and SCG maximum power values (e.g., $P_{MCG}$ and $P_{SCG}$, respectively). A maximum power value may indicate a maximum transmit power for a transmission on a corresponding cell group. In some cases, $P_{MCG}$ and $P_{SCG}$ may sum to less than a maximum UE transmit power of the UE 120, in which case the UE 120 is not power limited with regard to overlapped transmissions on the MCG and the SCG. In some aspects, $P_{MCG}$ and $P_{SCG}$ may sum to more than a maximum UE transmit power of the UE 120, in which case the UE 120 may be power limited with regard to overlapped transmissions on the MCG and the SCG, in certain circumstances.

As shown by reference number 420, the UE 120 may determine whether to use look-ahead (e.g., to perform power control using a time offset) based at least in part on the dynamic power sharing configuration and based at least in part on a combination of $P_{MCG}$ and $P_{SCG}$. For example, the UE 120 may determine whether a sum of $P_{MCG}$ and $P_{SCG}$ satisfies a threshold (e.g., is greater than a maximum UE transmit power ($P_{total}$) of the UE 120). As shown by reference number 430, when the combination of $P_{MCG}$ and $P_{SCG}$ fails to satisfy the threshold, the UE 120 may perform the transmissions on the MCG and the SCG without using a look-ahead for power control. As shown by reference number 440, when the combination of $P_{MCG}$ and $P_{SCG}$ satisfies the threshold, the UE 120 may perform the transmissions on the MCG and the SCG using the look-ahead for power control. Each of these approaches is described below.

When the combination of $P_{MCG}$ and $P_{SCG}$ fails to satisfy the threshold, the UE 120 may perform the transmissions on the MCG and the SCG without using look-ahead for power control. For example, the UE 120 may not consider T_offset when determining transmit powers of transmissions on the MCG and the SCG. In this case, if UE transmission(s) in slot $i_1$ of the MCG or in slot $i_2$ of the SCG do not overlap in time with any UE transmission(s) on the SCG or the MCG, respectively, the UE may determine a transmission power in slot $i_1$ of the MCG or in slot $i_2$ of the SCG without considering $P_{MCG}$ or $P_{SCG}$, respectively. For example, the UE 120 may determine the transmit power on the SCG or the MCG as prescribed in 3GPP Technical Specification 38.101-3 and/or in Clauses 7.1 through 7.5 of 3GPP Technical Specification 38.213. More specifically, the UE 120 may determine transmission power of each overlapped transmission in a CG and then, if the summation of transmission power of the overlapped transmissions in the CG exceeds the maximum transmission power of the UE (e.g., $P_{CMAX}$), the UE 120 may reduce or scale down the transmission power of one or more overlapped transmissions in the CG. For reduction or scaling-down of the transmission power, the channels or signals are selected. The transmissions with reduced or scaled down power are based at least in part on the priority order of the channels and signals, where the order is physical random access channel (PRACH) on the primary cell (PCell)>physical uplink control channel (PUCCH) with uplink control information (UCI)>PUSCH with UCI>PUSCH without UCI>sounding reference signal (SRS) or PRACH on a secondary cell (SCell). In this way, the UE may perform power control without using look-ahead in a situation when the UE 120 is not power-limited. This may reduce delay associated with the MCG, since the MCG's scheduling DCI does not need to adhere to the time offset associated with the look-ahead.

As shown by reference number 440, when the combination of $P_{MCG}$ and $P_{SCG}$ satisfies the threshold, the UE 120 may perform the transmissions on the MCG and the SCG using the look-ahead for power control. This procedure is described in more detail in connection with FIG. 3. For example, the UE 120 may use a baseline value for the transmission on the SCG's transmit power unless the transmission on the SCG is overlapped with a transmission on the MCG and the UE is power-limited. If the transmission on the SCG is overlapped with the transmission on the MCG, and if the UE 120 is power-limited (e.g., the sum of $P_{MCG}$ and $P_{SCG}$ is greater than $P_{total}$), then the UE 120 may reduce transmit power of the transmission on the SCG. Furthermore, the UE 120 may not receive, and the BS 110 may not transmit, UL DCI for a transmission on the MCG after a deadline (e.g., deadline 330 of FIG. 3) so that the UE 120 has adequate time to perform power control for the SCG. Thus, the UE 120 may perform power control when power-limited, based at least in part on look-ahead (e.g., a time offset) so that the UE 120 can provide sufficient transmit power for the MCG when the UE 120 is power limited. Furthermore, the UE 120 may perform power control without look-ahead when the UE 120 is not power limited, thereby reducing delay associated with scheduling the MCG.

As shown by reference number 450, the UE 120 may perform transmissions on the SCG and the MCG. For example, the UE 120 may determine respective transmit powers for the transmissions on the SCG and the MCG, and may perform the transmissions using the respective transmit powers.

As indicated above, FIG. 4 is provided as an example. Other examples may differ from what is described with respect to FIG. 4.

Figure 5:
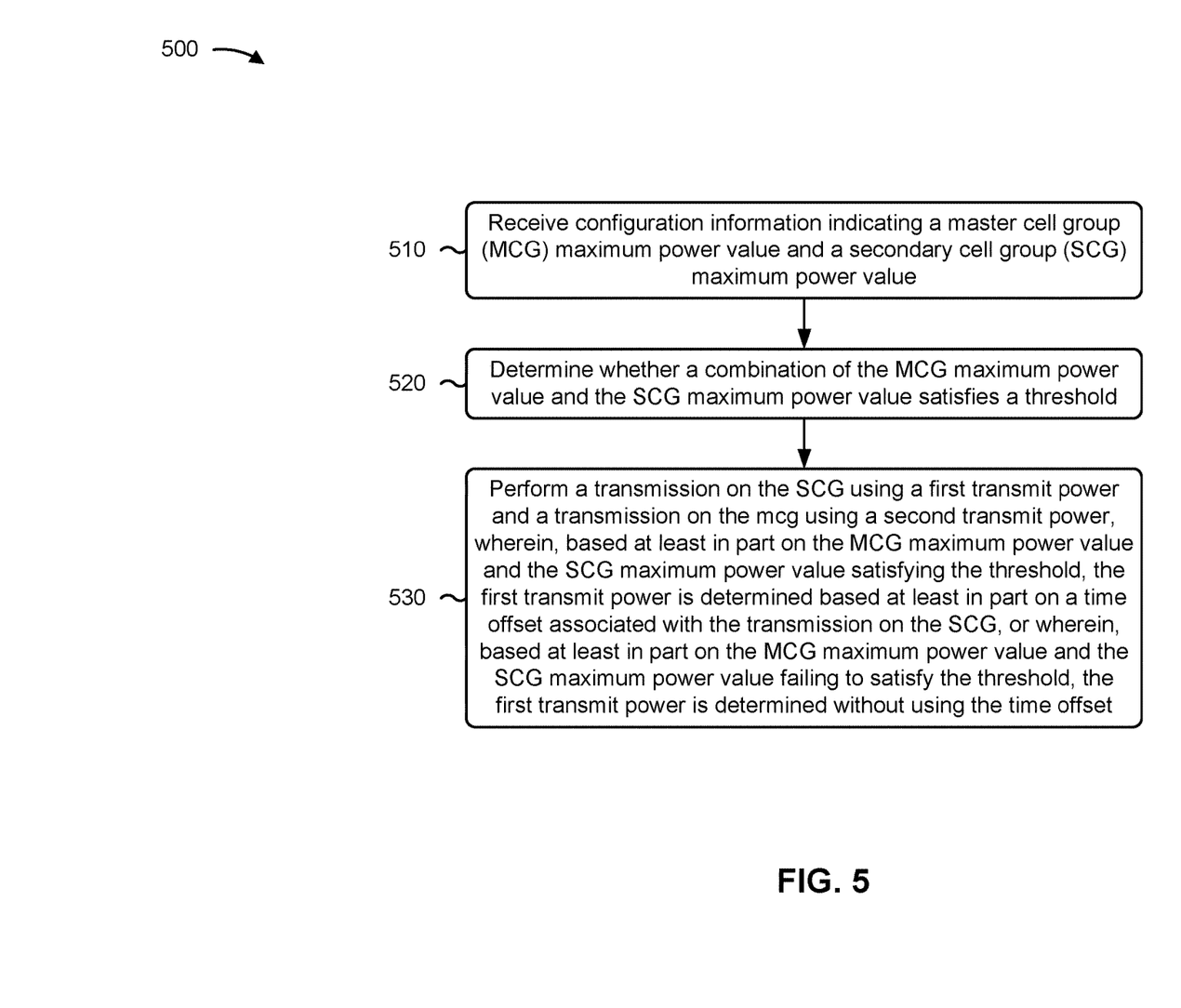
FIG. 5 is a diagram illustrating an example process performed, for example, by a user equipment, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with dynamic power sharing with or without look-ahead.

As shown in FIG. 5, in some aspects, process 500 may include receiving configuration information indicating an MCG maximum power value and an SCG maximum power value (block 510). For example, the UE (e.g., using antenna 252, DEMOD 254, MIMO detector 256, receive processor 258, controller/processor 280, and/or the like) may receive configuration information indicating an MCG maximum power value and an SCG maximum power value, as described above.

As further shown in FIG. 5, in some aspects, process 500 may include determining whether a combination of the MCG maximum power value and the SCG maximum power value satisfies a threshold (block 520). For example, the UE (e.g., using antenna 252, DEMOD 254, MIMO detector 256, receive processor 258, controller/processor 280, and/or the like) may determine whether a combination of the MCG maximum power value and the SCG maximum power value satisfies a threshold, as described above.

As further shown in FIG. 5, in some aspects, process 500 may include performing a transmission on the SCG using a first transmit power and a transmission on the MCG using a second transmit power, wherein, based at least in part on the combination of the MCG maximum power value and the SCG maximum power value satisfying the threshold, the first transmit power is determined based at least in part on a time offset associated with the transmission on the SCG, or wherein, based at least in part on the combination of the MCG maximum power value and the SCG maximum power value failing to satisfy the threshold, the first transmit power is determined without using the time offset (block 530). For example, the UE (e.g., using controller/processor 280, transmit processor 264, TX MIMO processor 266, MOD 254, antenna 252, and/or the like) may perform a transmission on the SCG using a first transmit power and a transmission on the MCG using a second transmit power, as described above. In some aspects, based at least in part on the combination of the MCG maximum power value and the SCG maximum power value satisfying the threshold, the first transmit power is determined based at least in part on a time offset associated with the transmission on the SCG. In some aspects, based at least in part on the combination of the MCG maximum power value and the SCG maximum power value failing to satisfy the threshold, the first transmit power is determined without using the time offset.

Process 500 may include additional aspects, such as any single aspect or any combination of aspects described below and/or in connection with one or more other processes described elsewhere herein.

In a first aspect, determining whether the combination of the MCG maximum power value and the SCG maximum power value satisfies the threshold further comprises determining whether a sum of the MCG maximum power value and the SCG maximum power value satisfies the threshold.

In a second aspect, alone or in combination with the first aspect, the configuration information indicates a dynamic power control mode for the UE.

In a third aspect, alone or in combination with one or more of the first and second aspects, based at least in part on the combination of the MCG maximum power value and the SCG maximum power value failing to satisfy the threshold and based at least in part on the transmission on the MCG being non-overlapped with the transmission on the SCG, the first transmit power and the second transmit power are determined without using the MCG maximum power value or the SCG maximum power value.

In a fourth aspect, alone or in combination with one or more of the first through second aspects, based at least in part on the combination of the MCG maximum power value and the SCG maximum power value failing to satisfy the threshold and based at least in part on the transmission on the MCG being at least partially overlapped with the transmission on the SCG, the first transmit power and the second transmit power are determined based at least in part on at least one of the MCG maximum power value or the SCG maximum power value.

In a fifth aspect, alone or in combination with one or more of the first through fourth aspects, process 500 includes determining the first transmit power based at least in part on whether a time at which control information, associated with the transmission on the MCG, is received precedes a start of the transmission on the SCG by at least the time offset.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving configuration information indicating a master cell group (MCG) maximum power value and a secondary cell group (SCG) maximum power value; determining whether a combination of the MCG maximum power value and the SCG maximum power value satisfies a threshold; and performing a transmission on the SCG using a first transmit power and a transmission on the MCG using a second transmit power, wherein, based at least in part on the combination of the MCG maximum power value and the SCG maximum power value satisfying the threshold, the first transmit power is determined based at least in part on a time offset associated with the transmission on the SCG, or wherein, based at least in part on the combination of the MCG maximum power value and the SCG maximum power value failing to satisfy the threshold, the first transmit power is determined without using the time offset.

Aspect 2: The method of Aspect 1, wherein determining whether the MCG maximum power value and the SCG maximum power value satisfy the threshold further comprises determining whether a sum of the MCG maximum power value and the SCG maximum power value satisfies the threshold.

Aspect 3: The method of either of Aspects 1 or 2, wherein the configuration information indicates a dynamic power control mode for the UE.

Aspect 4: The method of any of Aspects 1-3, wherein, based at least in part on the MCG maximum power value and the SCG maximum power value failing to satisfy the threshold and based at least in part on the transmission on the MCG being non-overlapped with the transmission on the SCG, the first transmit power and the second transmit power are determined without using the MCG maximum power value or the SCG maximum power value.

Aspect 5: The method of any of Aspects 1-3, wherein, based at least in part on the MCG maximum power value and the SCG maximum power value failing to satisfy the threshold and based at least in part on the transmission on the MCG being at least partially overlapped with the transmission on the SCG, the first transmit power and the second transmit power are determined based at least in part on at least one of the MCG maximum power value or the SCG maximum power value.

Aspect 6: The method of any of Aspects 1-5, further comprising: determining the first transmit power based at least in part on whether a time at which control information, associated with the transmission on the MCG, is received precedes a start of the transmission on the SCG by at least the time offset.

Aspect 7: An apparatus for wireless communication at a device, comprising a processor; memory coupled with the processor; and instructions stored in the memory and executable by the processor to cause the apparatus to perform the method of one or more Aspects of Aspects 1-6.

Aspect 8: A device for wireless communication, comprising a memory and one or more processors coupled to the memory, the memory and the one or more processors configured to perform the method of one or more Aspects of Aspects 1-6.

Aspect 9: An apparatus for wireless communication, comprising at least one means for performing the method of one or more Aspects of Aspects 1-6.

Aspect 10: A non-transitory computer-readable medium storing code for wireless communication, the code comprising instructions executable by a processor to perform the method of one or more Aspects of Aspects 1-6.

Aspect 11: A non-transitory computer-readable medium storing a set of instructions for wireless communication, the set of instructions comprising one or more instructions that, when executed by one or more processors of a device, cause the device to perform the method of one or more Aspects of Aspects 1-6.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving configuration information identifying a dynamic power sharing configuration that indicates the UE is to use a dynamic power sharing between a master cell group (MCG) and a secondary cell group (SCG), wherein the dynamic power sharing configuration identifies a MCG maximum power value and a SCG maximum power value for the dynamic power sharing;
   determining whether a combination of the MCG maximum power value and the SCG maximum power value satisfies a threshold; and
   performing a transmission on the SCG using a first transmit power and a transmission on the MCG using a second transmit power,
      wherein, based at least in part on the combination of the MCG maximum power value and the SCG maximum power value satisfying the threshold, the first transmit power is determined based at least in part on a time offset associated with the transmission on the SCG, or
      wherein, based at least in part on the combination of the MCG maximum power value and the SCG maximum power value failing to satisfy the threshold, the first transmit power is determined without using the time offset.

2. The method of claim 1, wherein determining whether the combination of the MCG maximum power value and the SCG maximum power value satisfy the threshold further comprises determining whether a sum of the MCG maximum power value and the SCG maximum power value satisfies the threshold.

3. The method of claim 1, wherein the configuration information indicates a dynamic power control mode for the UE.

4. The method of claim 1, wherein, based at least in part on the combination of the MCG maximum power value and the SCG maximum power value failing to satisfy the threshold and based at least in part on the transmission on the MCG being non-overlapped with the transmission on the SCG, the first transmit power and the second transmit power are determined without using the MCG maximum power value or the SCG maximum power value.

5. The method of claim 1, wherein, based at least in part on the combination of the MCG maximum power value and the SCG maximum power value failing to satisfy the threshold and based at least in part on the transmission on the MCG being at least partially overlapped with the transmission on the SCG, the first transmit power and the second transmit power are determined based at least in part on at least one of the MCG maximum power value or the SCG maximum power value.

6. The method of claim 1, further comprising:
determining the first transmit power based at least in part on whether a time at which control information, associated with the transmission on the MCG, is received precedes a start of the transmission on the SCG by at least the time offset.

7. A user equipment (UE) for wireless communication, comprising:
a memory; and
one or more processors coupled to the memory, the one or more processors configured to:
receive configuration information identifying a dynamic power sharing configuration that indicates the UE is to use dynamic power sharing between a master cell group (MCG) and a secondary cell group (SCG), wherein the dynamic power sharing configuration identifies a MCG maximum power value and a SCG maximum power value;
determine whether a combination of the MCG maximum power value and the SCG maximum power value satisfies a threshold; and
perform a transmission on the SCG using a first transmit power and a transmission on the MCG using a second transmit power,
wherein, based at least in part on the combination of the MCG maximum power value and the SCG maximum power value satisfying the threshold, the first transmit power is determined based at least in part on a time offset associated with the transmission on the SCG, or
wherein, based at least in part on the combination of the MCG maximum power value and the SCG maximum power value failing to satisfy the threshold, the first transmit power is determined without using the time offset.

8. The UE of claim 7, wherein the one or more processors, to determine whether the combination of the MCG maximum power value and the SCG maximum power value satisfy the threshold, are further configured to determine whether a sum of the MCG maximum power value and the SCG maximum power value satisfies the threshold.

9. The UE of claim 7, wherein the configuration information indicates a dynamic power control mode for the UE.

10. The UE of claim 7, wherein, based at least in part on the combination of the MCG maximum power value and the SCG maximum power value failing to satisfy the threshold and based at least in part on the transmission on the MCG being non-overlapped with the transmission on the SCG, the first transmit power and the second transmit power are determined without using the MCG maximum power value or the SCG maximum power value.

11. The UE of claim 7, wherein, based at least in part on the combination of the MCG maximum power value and the SCG maximum power value failing to satisfy the threshold and based at least in part on the transmission on the MCG being at least partially overlapped with the transmission on the SCG, the first transmit power and the second transmit power are determined based at least in part on at least one of the MCG maximum power value or the SCG maximum power value.

12. The UE of claim 7, wherein the one or more processors are further configured to:
determine the first transmit power based at least in part on whether a time at which control information, associated with the transmission on the MCG, is received precedes a start of the transmission on the SCG by at least the time offset.

13. A non-transitory computer-readable medium storing one or more instructions for wireless communication, the one or more instructions comprising:
one or more instructions that, when executed by one or more processors of a user equipment (UE), cause the one or more processors to:
receive configuration information identifying a dynamic power sharing configuration that indicates the UE is to use a dynamic power sharing between a master cell group (MCG) and a secondary cell group (SCG), wherein the dynamic power sharing configuration identifies a MCG maximum power value and a SCG maximum power value for the dynamic power sharing;
determine whether a combination of the MCG maximum power value and the SCG maximum power value satisfies a threshold; and
perform a transmission on the SCG using a first transmit power and a transmission on the MCG using a second transmit power,
wherein, based at least in part on the combination of the MCG maximum power value and the SCG maximum power value satisfying the threshold, the first transmit power is determined based at least in part on a time offset associated with the transmission on the SCG, or
wherein, based at least in part on the combination of the MCG maximum power value and the SCG maximum power value failing to satisfy the threshold, the first transmit power is determined without using the time offset.

14. The non-transitory computer-readable medium of claim 13, wherein the one or more instructions that cause the one or more processors to determine whether the combination of the MCG maximum power value and the SCG maximum power value satisfy the threshold are further configured to cause the one or more processors to determine whether a sum of the MCG maximum power value and the SCG maximum power value satisfies the threshold.

15. The non-transitory computer-readable medium of claim 13, wherein the configuration information indicates a dynamic power control mode for the UE.

16. The non-transitory computer-readable medium of claim 13, wherein, based at least in part on the combination of the MCG maximum power value and the SCG maximum power value failing to satisfy the threshold and based at least in part on the transmission on the MCG being non-overlapped with the transmission on the SCG, the first transmit power and the second transmit power are determined without using the MCG maximum power value or the SCG maximum power value.

17. The non-transitory computer-readable medium of claim 13, wherein, based at least in part on the combination of the MCG maximum power value and the SCG maximum power value failing to satisfy the threshold and based at least in part on the transmission on the MCG being at least partially overlapped with the transmission on the SCG, the first transmit power and the second transmit power are determined based at least in part on at least one of the MCG maximum power value or the SCG maximum power value.

18. The non-transitory computer-readable medium of claim 13, wherein the one or more instructions, when executed by the one or more processors, further cause the one or more processors to:

determine the first transmit power based at least in part on whether a time at which control information, associated with the transmission on the MCG, is received precedes a start of the transmission on the SCG by at least the time offset.

19. An apparatus for wireless communication, comprising:
means for receiving configuration information identifying a dynamic power sharing configuration that indicates the apparatus is to use a dynamic power sharing between a master cell group (MCG) and a secondary cell group (SCG), wherein the dynamic power sharing configuration identifies a MCG maximum power value and a SCG maximum power value for the dynamic power sharing;
means for determining whether a combination of the MCG maximum power value and the SCG maximum power value satisfies a threshold; and
means for performing a transmission on the SCG using a first transmit power and a transmission on the MCG using a second transmit power,
wherein, based at least in part on the combination of the MCG maximum power value and the SCG maximum power value satisfying the threshold, the first transmit power is determined based at least in part on a time offset associated with the transmission on the SCG, or
wherein, based at least in part on the combination of the MCG maximum power value and the SCG maximum power value failing to satisfy the threshold, the first transmit power is determined without using the time offset.

20. The apparatus of claim 19, wherein means for determining whether the combination of the MCG maximum power value and the SCG maximum power value satisfy the threshold further comprises determining whether a sum of the MCG maximum power value and the SCG maximum power value satisfies the threshold.

21. The apparatus of claim 19, wherein the configuration information indicates a dynamic power control mode for the apparatus.

22. The apparatus of claim 19, wherein, based at least in part on the combination of the MCG maximum power value and the SCG maximum power value failing to satisfy the threshold and based at least in part on the transmission on the MCG being non-overlapped with the transmission on the SCG, the first transmit power and the second transmit power are determined without using the MCG maximum power value or the SCG maximum power value.

23. The apparatus of claim 19, wherein, based at least in part on the combination of the MCG maximum power value and the SCG maximum power value failing to satisfy the threshold and based at least in part on the transmission on the MCG being at least partially overlapped with the transmission on the SCG, the first transmit power and the second transmit power are determined based at least in part on at least one of the MCG maximum power value or the SCG maximum power value.

24. The apparatus of claim 19, further comprising:
means for determining the first transmit power based at least in part on whether a time at which control information, associated with the transmission on the MCG, is received precedes a start of the transmission on the SCG by at least the time offset.

* * * * *